United States Patent
Yamamoto et al.

(10) Patent No.: US 6,489,021 B2
(45) Date of Patent: Dec. 3, 2002

(54) MULTI-LAYER RESIN FILMS HAVING EXCELLENT OXYGEN GAS BARRIER PROPERTIES AND PROCESS FOR THEIR PRODUCTION

(75) Inventors: Yoshifumi Yamamoto, Inuyama (JP); Ichiro Kitaura, Inuyama (JP); Yutaka Matsumura, Inuyama (JP); Noriko Takahashi, Inuyama (JP); Takeshi Ohazama, Inuyama (JP); Chikao Morishige, Inuyama (JP)

(73) Assignee: Toyo Boseki Kabushiki Kaisha, Osaka-fu (JP)

( * ) Notice: Subject to any disclaimer, the term of this patent is extended or adjusted under 35 U.S.C. 154(b) by 0 days.

(21) Appl. No.: 09/803,154

(22) Filed: Mar. 12, 2001

(65) Prior Publication Data

US 2002/0037423 A1 Mar. 28, 2002

(30) Foreign Application Priority Data

Aug. 8, 2000 (JP) ........................................ 2000-240278

(51) Int. Cl.⁷ .......................... B32B 27/30; B29C 55/12
(52) U.S. Cl. ................. 428/336; 264/210.2; 264/210.7; 428/516; 428/520; 428/910
(58) Field of Search ............................... 428/35.4, 36.6, 428/36.7, 336, 516, 520, 910; 264/210.2, 210.7

(56) References Cited

U.S. PATENT DOCUMENTS

| | | | | |
|---|---|---|---|---|
| 4,478,889 A | * | 10/1984 | Maruhashi et al. | 427/230 |
| 5,192,620 A | * | 3/1993 | Chu et al. | 428/461 |
| 5,230,963 A | * | 7/1993 | Knoerzer | 428/520 |
| 5,449,552 A | * | 9/1995 | Bochow et al. | 428/323 |
| 5,552,212 A | * | 9/1996 | Knoerzer | 428/213 |

FOREIGN PATENT DOCUMENTS

WO WO 96/16799 * 6/1996

* cited by examiner

Primary Examiner—D. S. Nakarani
(74) Attorney, Agent, or Firm—Morrison & Foerster LLP

(57) ABSTRACT

The present invention provides a multi-layer resin film having excellent oxygen gas barrier properties, particularly even at high humidity, and further having no chlorine content. The multi-layer resin film of the present invention has a biaxially-stretched polypropylene resin film, an adhesive layer formed on at least one surface of the polypropylene resin film, and a polyvinyl alcohol resin layer formed on the adhesive layer, wherein the polyvinyl alcohol resin layer has a value of crystallinity parameter (CP (M//) ⊥) not less than 0.8. The multi-layer resin film of the present invention can be prepared by forming an adhesive layer on at least one surface of an unstretched polypropylene resin film; stretching the film in one direction; forming a polyvinyl alcohol resin layer on the adhesive layer; and stretching the film in another direction perpendicular to the direction of previous stretching.

4 Claims, 1 Drawing Sheet

MULTI-LAYER RESIN FILMS HAVING EXCELLENT OXYGEN GAS BARRIER PROPERTIES AND PROCESS FOR THEIR PRODUCTION

FILED OF INVENTION

The present invention relates to multi-layer resin films having excellent oxygen gas barrier properties (hereinafter abbreviated in some cases as "oxygen gas barrier films") and a process for their production. More particularly, it relates to multi-layer resin films having excellent oxygen gas barrier properties even at high humidity and a process for their production.

The multi-layer resin films of the present invention have excellent oxygen gas barrier properties, particularly even at high humidity, and therefore, they can be applied in various fields. The oxygen gas barrier films of the present invention can be used, mainly in the field of packaging, for example, suitably for food packaging films.

BACKGROUND OF THE INVENTION

Various resin films have been used as packaging materials to pack or package various articles including food and drink, medicines, chemicals, and miscellaneous goods for daily use. For example, polypropylene films have been widely used for many applications because of their excellent characteristics such as processability, transparency, and heat resistance. However, packaging materials for articles such as food and medicines, of which quality may be deteriorated by oxygen gas, have been required to have high oxygen gas barrier properties (i.e., oxygen gas blocking properties) for preserving or keeping the quality of these articles to be packaged therewith. Therefore, polypropylene films having no sufficient oxygen gas barrier properties have met difficulty in their application.

As the resin films having improved oxygen gas barrier properties in comparison with resin films having low oxygen gas barrier properties, such as polypropylene films, there have been widely used for many applications, for example, polyvinylidene chloride resin (hereinafter abbreviated in some cases as "PVDC resin") coated films prepared by coating PVDC resins on base resin films such as polypropylene films. PVDC resin coated films have good oxygen gas barrier properties even at high humidity because of their extremely low moisture absorption. However, they have a serious problem that evolution of chlorine gas will be caused in their incineration. In recent years, there has been a particular demand for resin films having no chlorine content as part of anti-dioxin measures and further having high oxygen gas barrier properties. As such resin films, there have been proposed, for example, polyvinyl alcohol resin (hereinafter abbreviated in some cases as "PVA resin") coated films prepared by coating PVA resins on base resin films. PVA resin coated films have excellent oxygen gas barrier properties at low humidity. However, they have deteriorated oxygen gas barrier properties with a rise in humidity because of their high moisture absorption, and therefore, they have no sufficient practical use as the substitutes for PVDC resin coated films.

As the resin films having improved moisture absorption in comparison with such PVA resin coated films, there have been proposed, for example, ethylene vinyl alcohol copolymer resin (hereinafter abbreviated in some cases as "EVOH resin") coated films prepared by coating EVOH resins on base resin films. EVOH resin coated films have improved moisture absorption. However, they have lower oxygen gas barrier properties at low humidity in comparison with PVA resin coated films, and therefore, they have no sufficient oxygen gas barrier properties.

JP-A 3-30944 discloses a method for adding colloidal hydrated phyllosilicate compounds having swell properties to PVA resin coating solutions", and JP Patent No. 2,789,705 discloses polyvinyl alcohols modified with at least one of colloidal hydrated phyllosilicate compounds having swell properties or compounds containing silyl groups in the molecules. However, any coated films prepared by coating these materials on base resin films need high cost of production, and therefore, they are not sufficient as the substitutes for PVDC resin coated films with low cost of production.

Further, JP-A 49-64676 discloses a technique of forming PVA resin layers on polyethylene terephthalate films as the base resin films and then stretching the laminated films, and this reference teaches that resin films prepared by applying aqueous polyvinyl alcohol solutions onto uniaxially-stretched polypropylene resin films as the base resin films and then stretching the laminated films have insufficient adhesion properties between the PVA resin layers and the base resin films.

In any case, there have not yet been provided multi-layer resin films having high oxygen gas barrier properties, which can take the place of PVDC resin coated films, particularly multi-layer resin films which can exhibit excellent oxygen gas barrier properties even at high humidity and which can be produced at low cost.

SUMMARY OF THE INVENTION

Under these circumstances, the present inventors have extensively studied to obtain resin films having excellent oxygen gas barrier properties, particularly even at high humidity, and further having no chloride content, as well as a process for producing such oxygen gas barrier films at low cost. As a result, they have found that excellent oxygen gas barrier properties even at high humidity can be exhibited by multi-layer resin films comprising polyvinyl alcohol resin layers (hereinafter abbreviated in some cases as "PVA layer (s)") having specific values of crystallinity parameter, which have been formed, together with interposed adhesive layers, on at least one surface of biaxially-stretched polypropylene resin films, thereby completing the present invention.

Thus the present invention provides a multi-layer resin film having excellent oxygen gas barrier properties, comprising a biaxially-stretched polypropylene resin film, an adhesive layer formed on at least one surface of the polypropylene resin film, and a polyvinyl alcohol resin layer formed on the adhesive layer, wherein the polyvinyl alcohol resin layer has a value of crystallinity parameter (CP (M//) ⊥) not less than 0.8.

The multi-layer resin film having excellent oxygen gas barrier properties of the present invention can be prepared by forming an adhesive layer on at least one surface of an unstretched polypropylene resin film; stretching the film in one direction; forming a polyvinyl alcohol resin layer on the adhesive layer; and stretching the film in another direction perpendicular to the direction of previous stretching.

DETAILED DESCRIPTION OF THE INVENTION

Figure 1:
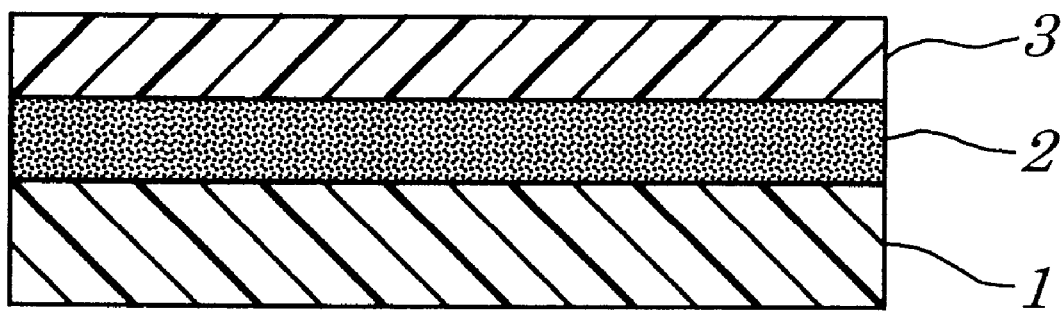
FIG. 1 is a sectional view schematically showing one example of the multi-layer resin film of the present invention.

The oxygen gas barrier film of the present invention is a multi-layer resin film having a structure as shown in FIG. 1, where the multi-layer resin film is composed of a biaxially-stretched polypropylene resin film 1 as the base resin film, an adhesive layer 2 formed on at least one surface of the base resin film, and a PVA resin layer 3 formed on the adhesive layer.

FIG. 1 is a schematic view illustrating the oxygen gas barrier film of the present invention; however, the present invention is not limited to this example. The oxygen gas barrier film of the present invention may further have additional films of any resins, such as heat-sealable resins, or any other materials, which additional films are formed either on the base resin film or on the PVA resin layer, or both, depending upon the purpose. The oxygen gas barrier film of the present invention may be subjected to various kinds of processing, such as laminating and printing, depending upon the purpose. The oxygen gas barrier film of the present invention may further have additional layers other than the adhesive layer, between the base resin film and the PVA resin layer, so long as the additional layers exert no harmful influence on the oxygen gas barrier properties.

For the base resin film in the present invention, polypropylene resin films known in the art can be used, of which materials, their mixing ratios, and other factors are not particularly limited. For example, they may be made of polypropylene homopolymers (propylene single polymers); random copolymers, block copolymers, or other copolymers composed mainly of polypropylene with at least one α-olefin monomer selected from ethylene, butene, pentene, and hexene; or mixtures of at least two of these polymers. In short, they may be made of any polypropylene resin film.

For the purpose of improving the physical properties, the base resin film may contain additives known in the art, such as antioxidants, antistatic agents, and plasticizers. Examples of such a base resin film may include polypropylene resin films containing petroleum resins or terpene resins.

The base resin film in the present invention may be in any thickness, depending upon the purpose, for example, the improvement of mechanical strength, transparency, and other physical properties. Thus the film thickness is not particularly limited, but may preferably be in the range of 10 to 250 $\mu$m for ordinary cases and in the range of 15 to 60 $\mu$m for use as packaging materials.

The base resin film in the present invention may be subjected to any treatment, depending upon the purpose, for example, surface treatment by any of the conventional methods known in the art, such as corona discharge treatment, plasma treatment, ozone treatment, and chemical treatment; or anchor treatment using anchor treatment agents known in the art.

The base resin film which can be used in the present invention may be either a single-layer film made of a polypropylene resin or a multi-layer film having at least two resin films containing a polypropylene resin film. For multi-layer films, the type of layers, the number of layers, the method for their formation, and other factors are not particularly limited, but can be freely selected from the methods known in the art, depending upon the purpose.

The adhesive layer in the present invention is formed between the base resin film and the PVA resin layer to have an effect on the adhesion of the PVA resin layer to the base resin film. The adhesive layer may be either a single layer or a multiple layer having at least two resin layers formed one on top of another. For multiple layers, the type of layers, the number of layers, the method for their formation, and other factors are not particularly limited, so long as the adhesive layer stands between the base resin film and the PVA resin layer to make possible the adhesion of the PVA resin layer to the base resin film.

The material of the adhesive layer is not particularly limited, but the adhesive layer may preferably contain acid-modified polyolefins. For example, the adhesive layer may preferably contain acid-modified polyolefins prepared by modifying polyolefin polymers with unsaturated carboxylic acids such as (meth)acrylic acid, maleic acid, maleic anhydride, and fumaric acid. In particular, graft copolymers prepared by graft copolymerization of olefin monomers with 0.01 to 5 mol % maleic acid or maleic anhydride can suitably be used in the adhesive layer.

The thickness of the adhesive layer is not particularly limited, but may preferably be adjusted in the range of 0.5 to 5 $\mu$m from the viewpoints of adhesion properties and cost. The adhesive layer may contain antistatic agents and other additives, depending upon the purpose.

The composition of components in the adhesive layer is not particularly limited, but can be made in suitable combination, depending upon the purpose. For example, in the case where the adhesive layer is composed of acid-modified polyolefins and additives, the composition of these components may be 99% acid-modified polyolefins and 1% additives.

For the PVA resin layer in the present invention, the materials, their mixing ratios, the presence or absence of additives, and other factors are not particularly limited, so long as the PVA resin layer has a value of crystallinity parameter (CP (M//) ⊥) not less than 0.8 as determined from the specific polarized infrared attenuated total reflection (ATR) spectrum. If the value of CP (M//) ⊥ is not less than 0.8, the multi-layer resin film of the present invention can exhibit excellent oxygen gas barrier properties even at high humidity in comparison with the conventional PVA resin coated films.

The crystallinity parameter in the present invention can be determined for PVA resin layers of oxygen gas barrier films by the ATR technique with a polarized IR beam, and more specifically, it is a value of crystallinity parameter (CP (M//) ⊥) as determined from the ATR spectrum. The crystallinity of PVA resin layers is usually evaluated by the absorption intensity (or absorbance) at about 1140 cm$^{-1}$ in IR spectra; however, the spectral absorption intensity (or absorbance) in the ATR spectra is greatly influenced by the measured area, thickness, and surface conditions of a sample, and therefore, the evaluation may preferably be carried out by a relative intensity of that absorption intensity (or absorbance) to the absorption intensity (or absorbance) at another wave number. For this reason, the crystallinity in the present invention is evaluated by a relative intensity of the absorption intensity (or absorbance) at about 1140 cm$^{-1}$ to the absorption intensity (or absorbance) at about 1095 cm$^{-1}$. Since higher crystallinity provides more excellent oxygen gas barrier properties, the PVA resin layer may preferably have a value of crystallinity parameter (CP (M//) ⊥) nor less than 1.0, more preferably not less than 1.2, and most preferably not less than 1.9.

In the present invention, four kinds of IR ATR spectra can be obtained by using four kinds of infrared light, each of which comes from one direction in the plane containing both the normal line of the film surface and the direction of film delivery or from another direction in the plane containing both the normal line of the film surface and the widthwise direction of the film (i.e., the direction perpendicular to the direction of film delivery) and has the direction of polarization parallel or vertical to the plane of incidence or reflection (i.e., the plane containing both the direction of incident light and the direction of reflected light). So, the four IR ATR spectra can be obtained from the surface of PVA resin layer for the four possible combination of sample and polarizer orientation. In particular, the degrees of orientation and crystallinity improved by stretching can be determined by evaluation of crystallinity parameter CP (M//) ⊥ in the polarized light ATR spectrum obtained with infrared light coming from a direction in the plane containing both the normal line of the film surface and the widthwise direction of the film and having the direction of polarization vertical to the plane of incidence or reflection.

The PVA resin layer in the present invention may contain various additives known in the art, whether inorganic or organic, such as antistatic agents, lubricants, and anti-blocking agents. The kinds and amounts of additives are not particularly limited, so long as they fall within the range exerting no harmful influence on the purpose of the present invention.

The PVA resin layer may be made in any thickness, depending upon the oxygen gas barrier properties to be required, but may preferably be made in a minimum thickness necessary to exhibit oxygen gas barrier properties from the viewpoints of transparency, handling properties, and economy. In ordinary cases, the PVA resin layer may preferably be made not more than 1 µm in thickness after drying. If the PVA resin layer, even made not more than 1 µm in thickness, has a value of crystallinity parameter (CP (M//) 1) not less than 0.8, the multi-layer resin film of the present invention has excellent oxygen gas barrier properties.

The expression "excellent oxygen gas barrier properties" as used in the present invention refers to the case where a film has an oxygen permeability of 1000 mL/m$^2$·day·MPa or lower under an atmosphere at the relative humidity of 85%.

The production process for the oxygen gas barrier film of the present invention will be explained below in detail, and it should be understood that the preparation of the oxygen gas barrier film of the present invention with the addition of suitable changes, variations, or modifications to the production process is also included within the scope of the present invention.

The oxygen gas barrier film of the present invention can be prepared by a production process comprising forming an adhesive layer on at least one surface of an unstretched polypropylene resin film, stretching the film in one direction, forming a PVA resin layer on the adhesive layer, and stretching the film in another direction perpendicular to the direction of previous stretching.

The unstretched polypropylene resin film which can be used may be those known in the art. The materials, additives, method of film formation, and other factors are not particularly limited, but unstretched polypropylene resin films suitable for the purpose can be used. The thickness of the film, the presence or absence of additives, the number of layers, and other factors are not particularly limited as described above. In short, it may be any polypropylene resin film.

As described above, the material of the adhesive layer, the kinds and amounts of additives, and other factors are not particularly limited, so long as this layer has an effect on the adhesion properties between the base resin film and the PVA resin layer. For example, the adhesive layer may preferably contain acid-modified polyolefins prepared by modifying polyolefin polymers with unsaturated carboxylic acids such as (meth)acrylic acid, maleic acid, maleic anhydride, and fumaric acid. In particular, graft copolymers prepared by graft copolymerization of olefin monomers with 0.01 to 5 mol % maleic acid or maleic anhydride can suitably be used in the adhesive layer.

In the present invention, an adhesive layer is formed at least one surface of an unstretched polypropylene resin film, and as the method for its formation, for example, co-extrusion can be employed for the formation of an adhesive layer on an unstretched polypropylene resin film, in which case the temperature is not particularly limited, so long as it falls within the range of temperature ordinarily employed.

The base resin film having the adhesive layer formed thereon is then stretched in one direction, at which time the direction of stretching is not particularly limited. The stretch ratio can suitably be determined, depending upon the purpose, which is, therefore, not particularly limited, but may preferably be selected from the range of 4 to 6 in ordinary cases.

On top of the adhesive layer in the uniaxially-stretched film, a PVA resin layer is then formed. As the PVA resin layer, for example, there can be used aqueous polyvinyl alcohol solutions (hereinafter abbreviated as "aqueous PVA solution(s)") containing commercially available products of polyvinyl alcohol dissolved in water, together with plasticizers and additives in any amounts.

From the viewpoints of rendering more excellent oxygen gas barrier properties without having no harmful influence on the coating properties of the aqueous PVA solution and the stretchability of the film after coating, the degree of polymerization (hereinafter expressed by "number-average molecular weight") for the polyvinyl alcohol resin may preferably be in the range of 300 to 2600, more preferably 500 to 2000. If the degree of polymerization is lower than 300, crystallization may proceed at a high speed so that sufficient stretchability cannot be attained. In contrast, if the degree of polymerization is higher than 2600, the aqueous PVA solution may have high viscosity so that it can easily cause gelation, making it difficult to carry out coating.

The method for the formation of a PVA resin layer on an adhesive layer is not particularly limited, but any of the methods known in the art may be employed. For example, conventional methods known in the art, such as reverse roll coating, roll knife coating, and die coating, can be used for the formation of a PVA resin layer on an adhesive layer.

After the formation of the PVA resin layer, the film is stretched in another direction perpendicular to the direction of previous stretching, at which time the film may preferably be fed, immediately after the formation of the PVA resin layer, to the step of stretching in another direction perpendicular to the direction of previous stretching, without using any additional step of drying the PVA resin layer formed, so that the PVA resin layer is dried in a pre-heating zone at the step of stretching or by adjustment of conditions during stretching. The drying temperature is not particularly limited, but may preferably be in the range of about 80° C. to 170° C. in ordinary cases.

The stretch ratio at that time may suitably be determined, depending upon the purpose, which is, therefore, not particularly limited, but may preferably be selected in the range of 5 to 10, more preferably 8 to 10.

The stretching, after the formation of the PVA resin layer, in another direction perpendicular to the direction of previous stretching makes it possible to make the film thinner than the conventional PVA coated films and also to provide multi-layer resin films having excellent oxygen gas barrier properties because of their higher crystallinity, although they are thin films.

The oxygen gas barrier film of the present invention can be prepared by the in-line coating method involving the formation of PVA resin layers, followed by stretching and drying, during a series of steps in the production process for biaxially-stretched polypropylene resin films as described above, thus making a great reduction in the cost of production.

In the present invention, the expression "a series of steps in the production process for the biaxially-stretched polypropylene resin film" refers to the steps of introducing the material of a base resin film and the material of an adhesive layer into a laminating apparatus such as an extruder, biaxially stretching the laminated film, and winding the biaxially-stretched film.

On the other hand, the expression "the formation of the PVA resin layer by the off-line coating method" refers to the process requiring separate steps of applying and drying an aqueous PVA solution after the biaxial stretching of a base resin film having an adhesive layer formed thereon.

Therefore, a series of steps in the production process for the formation of a PVA resin layer by the in-line coating method may include at least co-extrusion of a base resin film and an adhesive layer, first stretching of the extruded film in one direction, coating of an aqueous PVA solution to form a PVA resin layer on the stretched film, and second stretching of the multi-layered film in another direction perpendicular to the direction of previous stretching (i.e., the first stretching).

Regarding the direction of stretching, the film may be stretched in the machine direction (i.e., the direction of film delivery) and then stretched in the transverse direction (i.e., the direction perpendicular to the direction of film delivery or the direction of previous stretching), or the film may be stretched in reverse order of direction. In the case where a series of steps are particularly employed in the production process, if the film is fist stretched in the transverse direction, the subsequent steps require large-sized apparatuses, and therefore, the film may preferably be first stretched in the machine direction.

The production process of the present invention makes it possible to provide at low cost multi-layer resin films exhibiting good adhesion properties between base resin films and PVA resin layers and having excellent oxygen gas barrier properties even at high humidity.

The oxygen gas barrier film of the present invention may further have any resin or other layers formed thereon, depending upon the purpose. For example, heat-sealable resin layers can be formed by any of the methods known in the art, such as extrusion laminating and dry laminating. The thermoplastic polymer used for the formation of such heat-sealable resin layers may include polyethylene resins such as high-density polyethylene (HDPE), low-density polyethylene (LDPE), and linear low-density polyethylene (LLDPE), polypropylene (PP) resins, ethylene-vinyl acetate copolymers, ethylene-α-olefin random copolymers, and ionomer resins. The ordinary heat-sealable resins may also be used. From the viewpoint of environment, for example, as part of anti-dioxin measures, it is desirable that the resin layers should be formed from chlorine-free resins.

EXAMPLES

The present invention will hereinafter be further illustrated by some examples; however, the present invention is not limited to these examples. It is understood that changes, variations, and modifications made without a departure from the purport of the present invention are also included in the present invention. Unless otherwise indicated, the values of concentration in the examples are expressed on the basis of weight.

Example 1

A resin mixture of 97% by weight of a polypropylene resin and 3% by weight of a petroleum resin with substantially no polar group ("ESCOREZ® E5300" available from TONEX CO., LTD.) as the material of a base resin film, and an acid-modified polyolefin ("ADMER® QB550" available from MITSUI CHEMICALS, INC.) as the material of an adhesive layer were independently melt kneaded with separate extruders. These materials were fed to a T-die at a ratio by weight of 18.5:1.5, respectively, followed by laminating in the T-die, co-extrusion in the double-layer state so that the resin temperature came to 260° C., and then casting the extruded film with a casting roll at 25° C., to give a double-layer resin film of 20 μm in thickness, which was composed of a base resin film of 18.5 μm in thickness and an adhesive layer of 1.5 μm in thickness.

The double-layer resin film was then stretched at a ratio of 4 in one direction (in the machine direction), resulting in a uniaxially-stretched polypropylene rein film. On the adhesive layer in the film thus obtained, an aqueous PVA solution (prepared by gradually adding PVA ("POLYVINYL ALCOHOL RS110" available from KURARAY CO., LTD.) to water with stirring; sealing and then heating the solution to about 90° C. with stirring to achieve the complete dissolution of PVA; and then lowering the temperature of the solution; and at the temperature of solution equal to 50° C., adding isopropyl alcohol so as to have a concentration of 7%) was applied by the reverse roll coating method so that the PVA resin layer after stretching had a thickness of 0.6 μm, to give a triple-layer resin film.

The triple-layer resin film was then stretched at a ratio of 9 in another direction (in the transverse direction) perpendicular to the direction of previous stretching, resulting in a multi-layer resin film as shown in FIG. 1. In this case, the coated aqueous PVA solution was dried in a pre-heating zone (80° C. to 170° C.) at the step of stretching.

Example 2

A multi-layer resin film was prepared substantially in the same manner as described in Example 1, except that "POLYVINYL ALCOHOL RS117" available from KURARAY CO., LTD. was used as PVA for the material of the aqueous PVA solution.

Example 3

A multi-layer resin film was produced substantially in the same manner as described in Example 2, except that the film after the formation of the PVA resin layer was stretched at a ratio of 8 in the transverse direction.

Example 4

A multi-layer resin film was produced substantially in the same manner as described in Example 2, except that the film after the formation of the PVA resin layer was stretched at a ratio of 5 in the transverse direction.

Comparative Example 1

A biaxially-stretched polypropylene resin film of 20 μm in thickness (containing 3% by weight of a petroleum resin having substantially no polar group, "ESCOREZ® E5300" available from TONEX CO., LTD.) was prepared as the base resin film, of which surface was subjected to corona discharge treatment and then to the application of an isocyanate adhesive as an anchor agent by the gravure coating method so that the amount of coating after drying came to 0.3 g/m². On the anchor layer in the film thus obtained, an aqueous PVA solution (prepared by gradually adding PVA ("POLYVINYL ALCOHOL RS105" available from KURARAY CO., LTD.) to water with stirring; sealing and then heating the solution to about 90° C. with stirring to complete the dissolution of PVA in a concentration of 15%; and then lowering the temperature of the solution; and at the temperature of solution equal to 50° C., adding isopropyl alcohol so as to have a concentration of 7%) was applied by the (off-line) gravure coating method, followed by drying, to give a multi-layer resin film of 2 μm in thickness.

Comparative Example 2

A multi-layer resin film was produced substantially in the same manner as described in Comparative Example 1, except that the gravure coating method for the formation of a PVA resin layer was modified to give a multi-layer resin film having a PVA resin layer of 0.7 μm in thickness.

Comparative Example 3

An attempt was made to prepare a double-layer resin film substantially in the same manner as described in Example 1, except that a PVA resin layer was formed directly on a base resin film without forming an interposed adhesive layer. However, no adhesion properties were provided between the PVA resin layer and the base resin film, and the PVA resin layer adhered to the control rollers during the winding of the film, which caused separation from the base resin film and resulted in no use as a test piece.

The multi-layer resin films obtained in Examples 1–4 and Comparative Examples 1–2 were measured for the crystallinity parameter (CP (M//) ⊥) and for the oxygen permeability at the relative humidity of 65% or 85%.

Crystallinity Parameter

Each test piece (45 mm in length×17 mm in width) was measured for crystallinity by the polarized infrared ATR technique using an ATR apparatus, i.e., Bio-Rad FT-IR (FTS-60A/896) equipped with an accessory for ATR measurement (available from Perkin-Elmer Corporation), a polarizer, and an internal reflection element (Ge, the incident angle of 45°, 2 mm in thickness×50 mm in length×20 mm in width) having symmetric edges. The infrared light at the edge portion was cut off so that the internal reflection element received infrared light only at the center portion (12 mm in width).

Each film was cut into a test piece so that the lengthwise direction of the test piece was taken parallel to the widthwise direction of the film (i.e., the direction perpendicular to the direction of film delivery). The test piece was set in the ATR apparatus so that the PVA resin layer was brought into close contact with the internal reflection element, and then measured by the irradiation of polarized infrared light coming from a direction in the plane containing both the normal line of the film surface and the widthwise direction of the film (i.e., the direction perpendicular to the direction of film delivery) and having the direction of polarization vertical to the plane of incidence or reflection on the test piece. The resulting spectrum was expressed by spectrum (M//) ⊥.

In the ATR spectrum (M//) ⊥ thus obtained, the values of absorbance were determined for the absorption at about 1140 cm⁻¹ and for the absorption at about 1095 cm⁻¹. At that time, a straight line drawn to connect the following two points: a valley on the higher wave number side of the peak at about 1140 cm⁻¹ and a valley on the lower wave number side of the peak at about of 1095 cm⁻¹, was taken as the base line, and the height of each peak in the absorption band taken from the base line was regarded as the value of absorbance in the absorption band responsible for the PVA resin layer. The values of absorbance for the peak at about 1140 cm⁻¹ and for the peak at about 1095 cm⁻¹ were expressed as $A_{1140}$ and $A_{1095}$, respectively. If no distinct peak was observed, the values of absorbance at the positions of 1140 cm⁻¹ and 1095 cm⁻¹ were regarded as $A_{1140}$ and $A_{1095}$, respectively.

For the spectrum (M//) ⊥, the ratio of $A_{1140}$ to $A_{1095}$ (i.e., $A_{1140}/A_{1095}$) was determined. This was regarded as a value of the crystallinity parameter and expressed by CP (M//) ⊥.

Oxygen Permeability

Each test film was measured for oxygen permeability at 23° C. under an atmosphere at the relative humidity of 65% or 85% for 30 minutes using "MOCON OX-TRAN 2/20" available from MODERN CONTROL CORPORATION.

Each test film was evaluated on the following criteria by the value of oxygen permeability under an atmosphere at the relative humidity of 85%.

not higher than 200 mL/m²·day·MPa: best;
higher than 200 but not higher than 500 mL/m²·day·MPa: better;
higher than 500 mL/m²·day·MPa but not higher than 1000 mL/m²·day·MPa: good;
higher than 1000 mL/m²·day·MPa: bad.

TABLE 1

| Test films | Crystallinity parameter CP(M//) ⊥ | Oxygen permeability (mL/m² · day · MPa) | | Evaluation |
| --- | --- | --- | --- | --- |
| | | 65% RH | 85% RH | |
| Example 1 | 2.00 | 5 | 180 | best |
| Example 2 | 1.93 | 6 | 270 | better |
| Example 3 | 1.29 | 10 | 410 | better |
| Example 4 | 1.08 | 40 | 810 | good |
| Comp. Ex. 1 | 0.44 | 40 | 3800 | bad |
| Comp. Ex. 2 | 0.50 | 40 | 6000 | bad |

As can be seen from Table 1, the test films of Examples 1–4 had larger values of crystallinity parameter, i.e., improved crystallinity, and further had smaller values of oxygen permeability, i.e., excellent oxygen gas barrier properties, even at high humidity and equivalent values of oxygen permeability, i.e., equivalent oxygen gas barrier properties, at low humidity, although they had thinner PVA resin layers (0.6 μm in thickness), in comparison with the test films of Comparative Examples 1–2.

The production process of the present invention makes it possible to form PVA resin layers during a series of steps in the production process for biaxially-stretched polypropylene resin films (by the in-line coating method), which is extremely practical and low-cost for the production on an industrial scale, in comparison with the production process for the conventional PVA resin coated film (by the off-line coating method).

The multi-layer resin film of the present invention has the advantage that it has excellent oxygen gas barrier properties even at high humidity in comparison with the conventional biaxially-stretched polypropylene resin films or the conventional PVA resin coated films prepared by coating PVA resins on biaxially-stretched polypropylene resin films.

The multi-layer resin films prepared by the production process of the present invention have thinner PVA resin layers in comparison with the conventional PVA resin coated films prepared by off-line coating aqueous PVA solutions on biaxially-stretched polypropylene resin films. The formation of PVA resin layers can be done during a series of steps in the production process for biaxially-stretched polypropylene resin films without adding a new step of forming the PVA resin layers, which makes it possible to carry out the production at low cost.

What is claimed is:

1. A multi-layer resin film having oxygen gas barrier properties, comprising a biaxially-stretched polypropylene resin film, an adhesive layer formed on at least one surface of the polypropylene resin film, and a polyvinyl alcohol resin layer formed on the adhesive layer, wherein the polyvinyl alcohol resin layer has a value of crystalline parameter (CP (M/) $\perp$) not less than 0.8 and the multi-layer resin film has an oxygen gas permeability of 1000 mL/m$^2$·day· MPa or lower under an atmosphere at the relative humidity of 85%.

2. The multi-layer resin film according to claim 1, wherein the polyvinyl alcohol resin layer has a thickness of 1 $\mu$m or less.

3. The multi-layer resin film according to claim 1, wherein the adhesive layer comprises an acid-modified polyolefin.

4. A process for the production of a multi-layer resin film having oxygen gas barrier properties according to claim, comprising:

forming an adhesive layer on at least one surface of an unstretched polypropylene resin film;

stretching the film in one direction;

forming a polyvinyl alcohol resin layer on the adhesive layer; and stretching the film in another direction perpendicular to the direction of previous stretching.

* * * * *

UNITED STATES PATENT AND TRADEMARK OFFICE
CERTIFICATE OF CORRECTION

PATENT NO.    : 6,489,021 B2                                                        Page 1 of 1
DATED         : December 3, 2002
INVENTOR(S)   : Yoshifumi Yamamoto et al.

It is certified that error appears in the above-identified patent and that said Letters Patent is hereby corrected as shown below:

<u>Title page,</u>
Item [75], Inventors, after "Takahashi," change "Inuyama" to -- Otsu-shi --;
After "Ohazama," change "Inuyama" to -- Otsu-shi --; and
After "Morishige," change "Inuyama" to -- Otsu-shi --.

<u>Column 11,</u>
Line 17, change "crystalline" to -- crystallinity --.

Signed and Sealed this

Twentieth Day of May, 2003

JAMES E. ROGAN
*Director of the United States Patent and Trademark Office*